Dec. 29, 1959 P. M. MAITLAND ET AL 2,918,983
BATTERY HOLD-DOWN DEVICE
Filed May 22, 1958
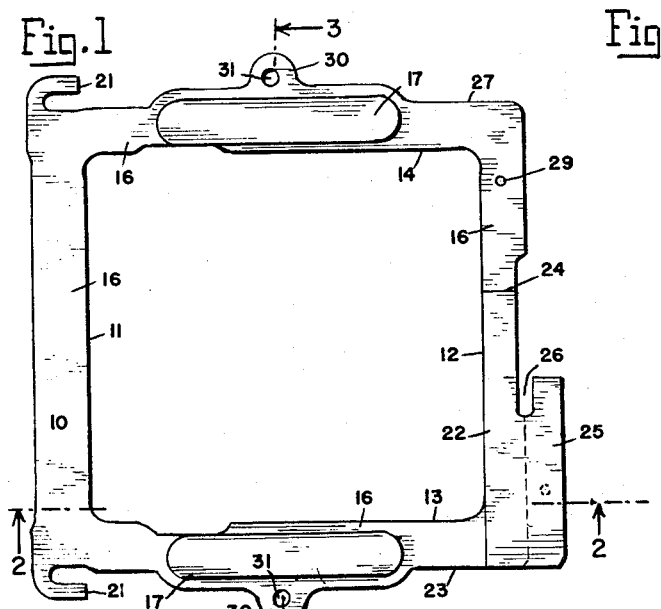
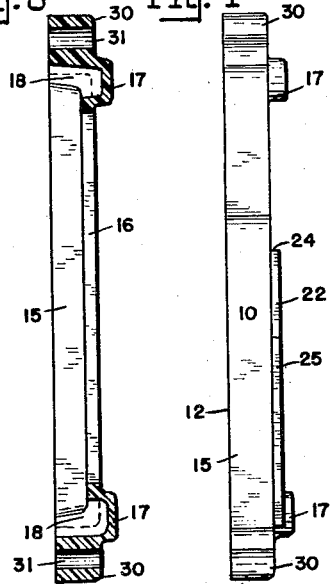
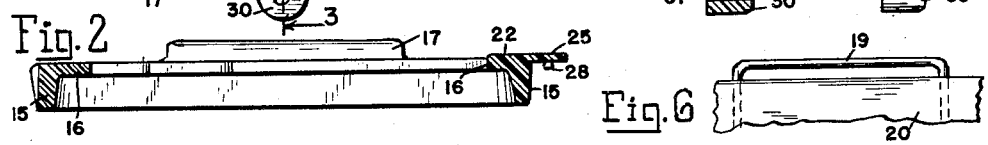
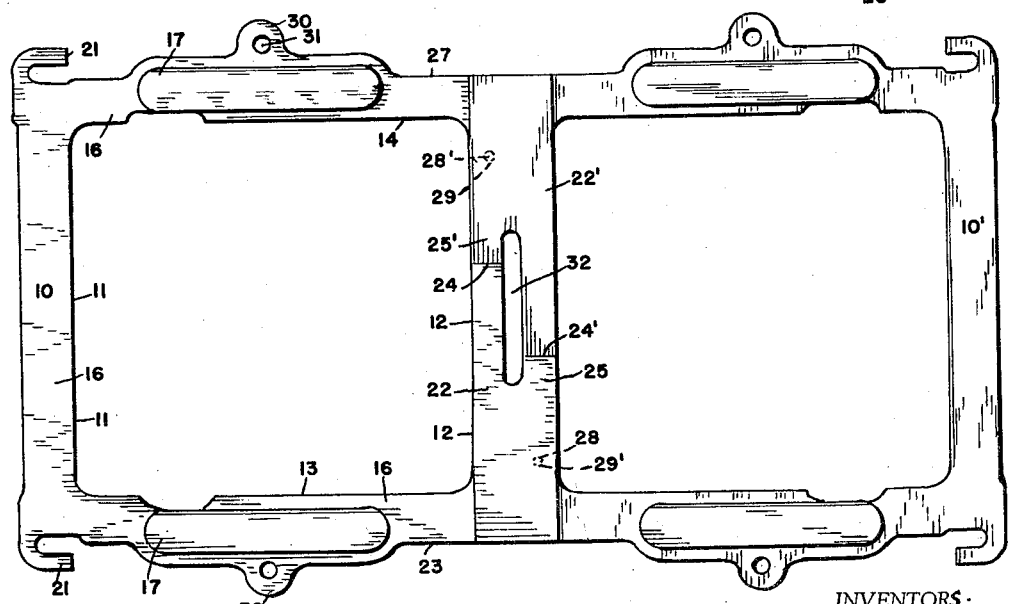
INVENTORS:
Peter M. Maitland
and Max Autritter
BY Sigmund Herzog
attorney.

United States Patent Office 2,918,983
Patented Dec. 29, 1959

2,918,983

BATTERY HOLD-DOWN DEVICE

Peter M. Maitland, Lancaster, and Max Antritter, Boylston, Mass., assignors to Van Brode Milling Co., Inc., Clinton, Mass., a corporation of Massachusetts Application May 22, 1958, Serial No. 737,170

2 Claims. (Cl. 180—68.5)

The present invention relates to improvements in battery hold-down devices, and more particularly to the type which fits and binds storage batteries in position on their supports.

More specifically, the invention pertains to hold-down devices made of plastic material, and has for one of its objects to provide a hold-down frame which is so constructed that it will fit not only a single battery but may be adopted as a hold-down when the vehicle is equipped with two batteries, arranged side by side.

A further object of the invention is the provision of a hold-down frame which is simple in construction, efficient in operation and capable of manufacture on a commercial scale or, in other words, one which is not so difficult to make as to be beyond the reasonable cost of such a contrivance.

With these and other objects in view, which will more fully appear as the nature of the invention is better understood, the same consists in the combination, arrangement and construction of the elements hereinafter described, pointed out in the appended claims and illustrated in the accompanying drawings, it being understood that many changes may be made in the size and proportion of the several elements and details of construction within the scope of the appended claims, without departing from the spirit or sacrificing any of the advantages of the invention.

One of the many possible embodiments of the invention is illustrated in the accompanying drawings, in which:

Figure 1 is a top plan view of the improved holding device;

Fig. 2 is a section taken on line 2—2 of Fig. 1;

Fig. 3 is a section taken on line 3—3 of Fig. 1;

Fig. 4 is a side elevation of Fig. 1;

Fig. 5 is a top plan view of two of the frames illustrated in Fig. 1, so combined as to serve as the means for holding down two batteries on their support; and Fig. 6 is an end view of a portion of the end wall of a battery box and its handle.

Referring now first to Figs. 1 to 4, inclusive, of the drawings, the numeral 10 indicates a one-piece hold-down frame of open rectangular shape, complementary to the size and shape of the conventional battery box. It comprises two sides 11 and 12, connected by parallel ends 13 and 14. Each of said sides and ends consists of an angle bar, having a vertical flange 15 and a horizontal flange 16. The vertical flanges of the sides and ends of the frame are adapted to abut against the sides and ends, respectively, of the battery box, while the horizontal flanges are designed to bear against the top surfaces of said box sides and ends and also against the exposed faces of the cover sections of the battery. On both frame ends 13 and 14 are formed protuberances 17, which extend longitudinally of said ends and are provided with recesses 18 in their underfaces, to accommodate handles 19 on the endwalls 20 of the battery box when the hold-down frame is applied to said box. On each end of the frame side 11 is provided a hook-shaped extension 21, adapted to receive a bolt on the battery support, for co-operation with a nut bearing against the exposed face of the extension 21 and serving to press the hold-down frame firmly into contact with the top surfaces of the box sides and ends and with the box cover sections, thereby fixing the position of the battery box on its support. A third bolt is usually centrally arranged on the battery support adjacent the opposite side of the battery box, the nut cooperating with the last-mentioned bolt being adapted to bear against a flat elevation 22 on the frame side 12, said elevation extending from the outer edge 23 of the frame end 13 beyond the center of the frame side 12 and forming at its end an abutment 24, for a purpose hereinafter to be described. The elevation 22 projects laterally beyond the frame side 12, as shown at 25, being reduced in width near its free longitudinal end, to form a recess 26. The thickness of said projection corresponds to the height of said elevation. The abutment 24 is disposed at a distance from the outer edge 27 of the frame end 14 which equals the distance of the free end of the projection 25 from the edge 23 of the frame end 13. From the underface of the projection 25 extends downwardly a lug 28, and in the horizontal flange 16 of the side 12 of the frame is formed an aperture 29 at a distance from the outer edge 27 of the frame end 14 which is equal to the distance between the center of the lug 28 and the edge 23 of the frame end 13.

Since on some battery supports the hold-down bolts are located adjacent the ends of the battery box in the longitudinal center line of the box, the hold-down frame ends 13 and 14 are provided each with a centrally located projection 30, having an aperture 31, to receive a hold-down bolt.

All of the elements of the hold-down frame described constitute an integral structure or, in other words, all of the elements thereof are molded to form a one-piece frame. A suitable high-impact plastic is used in molding the frame.

The operation of the frame, when applied to a single battery, is obvious from the foregoing description, the projection 25, abutment 24, lug 28 and aperture 29 having no functions in this instance.

When a vehicle is equipped with two twelve-volt batteries, arranged side by side and connected, for instance, in series to yield a twenty-four-volt unit, two of the frames above described are combined, as shown in Fig. 5 of the drawings. The frame 10 above described is combined with a frame 10', identical in construction in all respects with that of the frame 10. However, as illustrated in Fig. 5 of the drawings, the corresponding elements of the two frames are disposed at an angle of 180 degrees in relation to one another. In combining the two frames, the projection 25' of the frame 10' is superposed on the side 12 of the frame 10, the lug 28' of the frame 10' being extended through the perforation 29 in the frame 10, and the projection 25 of the frame 10 being superimposed on the side 12' of the frame 10' and the lug 28 of the frame 10 being seated in the perforation 29' in the frame 10'. In these positions of the elements, the reduced free end of the projection 25' of the frame 10' bears against the abutment 24 of the elevation 22 of the frame 10, and the reduced free end of the projection 25 bears against the abutment 24' of the elevation 22' of the frame 10'. A slot 32 is thus formed between the elevations 22 and 22', for the reception of the hold-down bolt on the battery support between the two batteries, arranged side by side.

One of the advantages of the construction is that only one mold is needed for forming the hold-down device even though it is being used as a combination for fixing the positions of two batteries on their support. Another advantage is obtained due to the fact that either one of the two batteries may be removed from the support without having to disturb the other battery. For instance, if the battery under the frame 10 is to be removed for recharging or repair, the nuts co-operating with the bolts projecting through the hook-shaped extensions 21 thereof are disengaged from said bolts, and the nut engaging the bolt between the batteries loosened. These operations permit tilting of the frame 10 to unseat the lugs 28 and 28' from the apertures 29' and 29, whereby the frame 10 is adapted to be disengaged from its battery, leaving the frame 10' in clamping position relative its battery.

What we claim is:

1. A battery hold-down frame, comprising a one-piece open rectangular structure of plastic material including sides and ends connecting said sides, each of said sides and ends consisting of an angle bar having a vertical flange and a horizontal flange, said vertical flanges being adapted to abut against the sides and ends of the battery box and said horizontal flanges being adapted to bear against the top surfaces of the battery box ends and sides, hook-shaped extensions on the ends of one of the sides of said frame for co-operation with hold-down bolts on the battery support, an elevated portion on the horizontal flange of the other one of said frame sides forming an abutment on said flange, a lateral projection on said elevated portion having the thickness of the latter and extending from the outer edge of one of said frame ends toward the other frame end and being reduced in width adjacent its free end to form a recess, said abutment being disposed at a distance from the outer edge of the adjacent frame end which equals the distance between the outer end of said projection and the outer edge of the other frame end, and a lug on the underface of said projection, the horizontal flange on which said elevated portion is formed being provided with an aperture at a distance from the outer edge of the adjacent frame end which is equal to the distance between said lug and the outer edge of the other frame end.

2. A battery hold-down frame according to claim 1, a longitudinally extending protuberance on each frame end provided with a recess in its underface, adapted to receive a handle on the end wall of the battery box.

References Cited in the file of this patent
UNITED STATES PATENTS

| | | |
|---|---|---|
| 1,034,003 | Edison | July 30, 1912 |
| 2,710,660 | Coleman | June 14, 1955 |